US012599946B2

(12) United States Patent
Wu et al.

(10) Patent No.: US 12,599,946 B2
(45) Date of Patent: Apr. 14, 2026

(54) METHOD OF PYROLYSIS FOR WASTE LIGHT-EMITTING ELECTRONIC COMPONENTS AND RECOVERY FOR RARE-EARTH ELEMENT

(71) Applicant: BEIJING UNIVERSITY OF TECHNOLOGY, Beijing (CN)

(72) Inventors: Yufeng Wu, Beijing (CN); Shuhao Zhang, Beijing (CN)

(73) Assignee: BEIJING UNIVERSITY OF TECHNOLOGY, Beijing (CN)

( * ) Notice: Subject to any disclaimer, the term of this patent is extended or adjusted under 35 U.S.C. 154(b) by 574 days.

(21) Appl. No.: 17/978,931

(22) Filed: Nov. 1, 2022

(65) Prior Publication Data

US 2023/0067876 A1 Mar. 2, 2023

Related U.S. Application Data

(63) Continuation of application No. PCT/CN2021/115976, filed on Sep. 1, 2021.

(30) Foreign Application Priority Data

Jul. 10, 2020 (CN) .......................... 202010662003.7

(51) Int. Cl.
*B09B 3/40* (2022.01)
*B03C 1/23* (2006.01)
(Continued)

(52) U.S. Cl.
CPC ................. *B09B 3/40* (2022.01); *B03C 1/23* (2013.01); *B09B 3/70* (2022.01); *B09B 3/80* (2022.01);
(Continued)

(58) Field of Classification Search
CPC ...... C22B 7/007; C22B 59/00; B09B 2101/15
See application file for complete search history.

(56) References Cited

U.S. PATENT DOCUMENTS

2018/0119251 A1* 5/2018 Fox ........................ B01D 15/08

FOREIGN PATENT DOCUMENTS

CN 101307391 A * 11/2008
CN 101461024 A 6/2009
(Continued)

OTHER PUBLICATIONS

International Search Report of PCT/CN2021/115976.
(Continued)

*Primary Examiner* — Sally A Merkling
*Assistant Examiner* — Austin Pollock
(74) *Attorney, Agent, or Firm* — J.C. PATENTS

(57) ABSTRACT

The invention disclosed a method for recycling rare earth elements from waste light-emitting electronic components by pyrolysis and alkaline melting-acid leaching. Based on the pyrolysis properties of the organic polymer, through catalytic pyrolysis of the organic polymer material in electronic components and convert the carbon in the residue into water gas, realize high-efficient dismantling of waste electronic component packaging materials. The traditional problems that the compositions of waste light-emitting electronic components are difficult to disassemble are solved, the generated pyrolysis gas and water gas can continuously supply energy for the pyrolysis system and recover the heat in the flue gas to save energy. Meanwhile, based on the chemical dissolution reaction mechanism of phosphors, the combination process of alkali melting, and acid leaching is used to efficiently recover rare earth elements from the waste light-emitting electronic components, and the step leaching of rare earth elements is realized. The rare earth oxalate can (Continued)

be recovered by precipitation, which greatly reduces the difficulty of late separation and purification.

5 Claims, 1 Drawing Sheet

(51) Int. Cl.

| | | |
|---|---|---|
| *B09B 3/70* | (2022.01) | |
| *B09B 3/80* | (2022.01) | |
| *B09B 101/15* | (2022.01) | |
| *C10B 53/00* | (2006.01) | |
| *C10B 57/00* | (2006.01) | |
| *C10G 1/10* | (2006.01) | |
| *C22B 7/00* | (2006.01) | |
| *C22B 59/00* | (2006.01) | |

(52) U.S. Cl.
CPC ............ *C10B 53/00* (2013.01); *C10B 57/005* (2013.01); *C10G 1/10* (2013.01); *C22B 7/007* (2013.01); *C22B 59/00* (2013.01); *B03C 2201/20* (2013.01); *B09B 2101/15* (2022.01); *C10G 2300/1003* (2013.01)

(56) References Cited

FOREIGN PATENT DOCUMENTS

| CN | 102745735 | A | * | 10/2012 | |
|---|---|---|---|---|---|
| CN | 103627906 | A | * | 3/2014 | |
| CN | 103937891 | A | | 7/2014 | |
| CN | 104357665 | A | * | 2/2015 | |
| CN | 104779354 | A | | 7/2015 | |
| CN | 104946896 | A | | 9/2015 | |
| CN | 105489333 | A | * | 4/2016 | .......... C22C 38/001 |
| CN | 108878235 | A | | 11/2018 | |
| CN | 109055782 | A | | 12/2018 | |
| CN | 111020239 | A | | 4/2020 | |
| CN | 111826177 | A | * | 10/2020 | .............. B03C 1/23 |
| DE | 102013201376 | A1 | | 7/2014 | |
| WO | WO2013090817 | A1 | | 6/2013 | |
| WO | WO-2013166781 | A1 | * | 11/2013 | .......... C01F 17/0043 |
| WO | WO2014020958 | A1 | | 2/2014 | |
| WO | WO-2014071510 | A1 | * | 5/2014 | ............. C09K 11/01 |

OTHER PUBLICATIONS

Search Report of the priority application CN202010662003.7.
First Office Action of the priority application CN202010662003.7.
Notice of Allowance of the priority application CN202010662003.7.

* cited by examiner

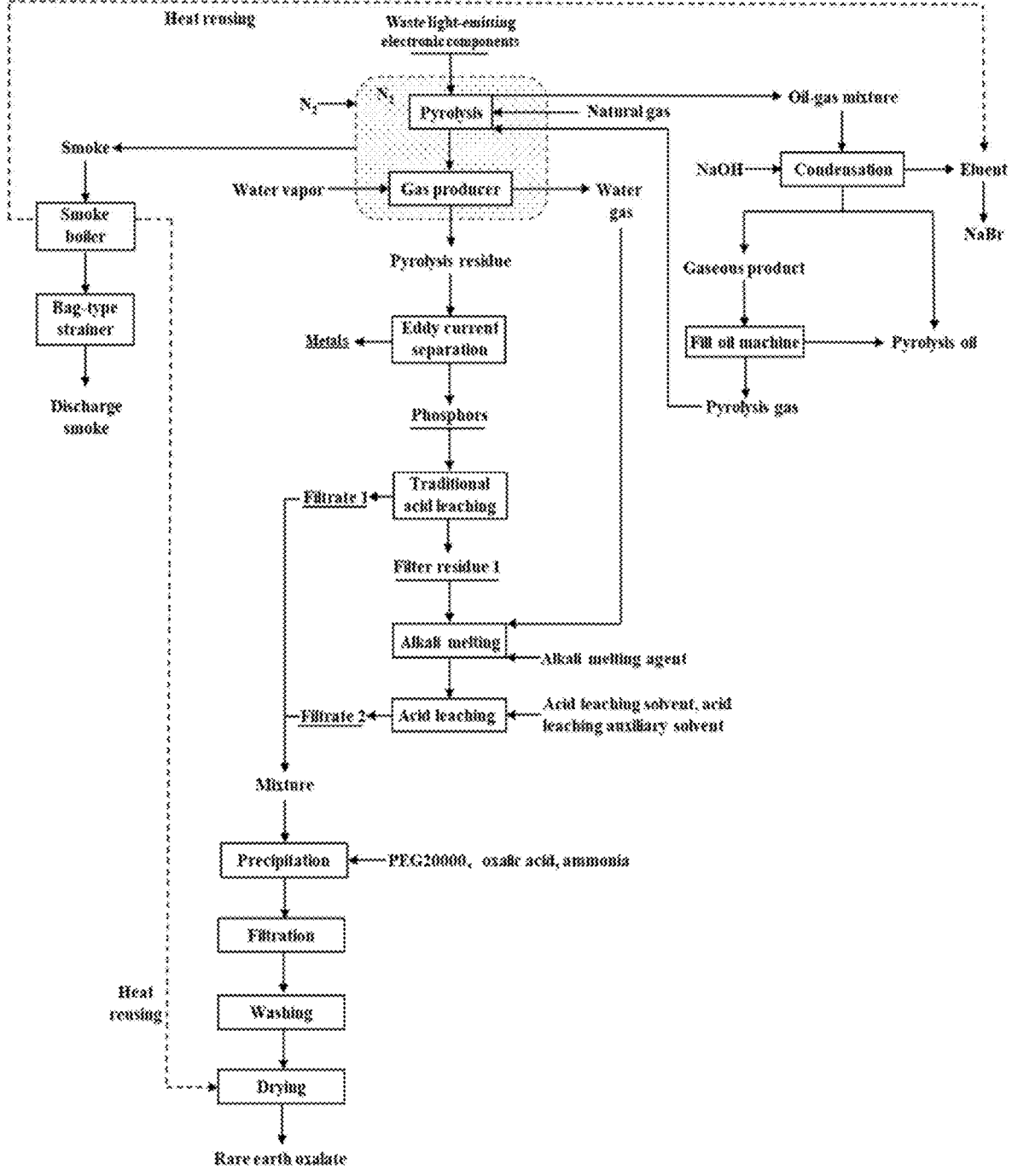

METHOD OF PYROLYSIS FOR WASTE LIGHT-EMITTING ELECTRONIC COMPONENTS AND RECOVERY FOR RARE-EARTH ELEMENT

CROSS REFERENCE TO RELATED APPLICATIONS

The present application is a continuation of international application PCT/CN2021/115976 filed on Sep. 1, 2021, which claims priority to the Chinese Patent Application No. 202010662003.7 filed on Jul. 10, 2020, the contents of the above identified applications are hereby incorporated by reference in their entireties.

TECHNICAL FIELD

The invention relates to a method for treating waste light-emitting electronic components, in particular to a method for recycling rare earth elements from waste light-emitting electronic components by pyrolysis and alkaline melting-acid leaching.

BACKGROUND ART

Light-emitting electronic components is a new type of electronic component, which has many advantages such as high luminous efficiency and long life, and has been widely used in transportation, display, lighting and other fields. In 2018, China's light-emitting electronic components production accounted for 70% of the global output, and the consumer market reached 308.52 billion yuan; it is expected that by 2020, it will reach 441.83 billion yuan, with a compound annual growth rate of 12.7%.

Light-emitting electronic components are affected by current and heat in actual use, and their average lifespan is about 3 years. With the widespread popularity of light-emitting electronic components, a large number of scrapped products have been generated. The average light-emitting electronic components contains about 2-5 mg of phosphors per piece, and if it is calculated at 3 mg per piece, according to preliminary estimates, in 2019 alone, the waste of phosphors caused by discarded light-emitting electronic components in China will reach 99.8 tons, which contains Eu and Rare earth elements such as Y, Ce, Tb, Gd, etc. If waste light-emitting electronic components are landfilled or incinerated together with domestic waste, the resin part of them will easily generate dioxins due to high temperature incineration, and the phosphors will cause harm to soil, water, etc., affecting the safety of the ecological environment. At the same time, due to long-term unreasonable exploitation and trade, China's rare earth resources have dropped from 74% of the world's total in the 1970s to 23% in 2013. Carrying out the harmless treatment and resource recycling of light-emitting electronic components can not only bring huge economic benefits, but also an important way to save rare earth mining and promote the sustainable utilization of rare earths.

At present, the recycling of waste light-emitting electronic components in China is still in its infancy, and related research work has just begun. The existing recycling research mainly focuses on light-emitting electronic components dismantling and semiconductor recycling, and rare earth recycling is rare. The mechanical dismantling of waste light-emitting electronic components adopts the methods of mechanical cutting, dismantling and crushing to separate the mechanisms, and adopts the methods of wind selection and electric selection (patents CN201210368117.6, CN201710884418.7, CN201811260077.7). The mechanical mechanism of this method is relatively simple, and large-scale and rapid separation can be realized, but this method will cause the mixing of metal and non-metal parts, which increases the technological difficulty of subsequent processing and increases environmental risks. At the same time, the phosphors in waste light-emitting electronic components are difficult to recover by conventional acid leaching. For example, SiAlON: $Eu^{2+}$ of nitride system belongs to hexagonal crystal and has high chemical stability, and its structure is difficult to be destroyed by conventional acid leaching method; $(Y,Gd)_3(Al,Ga)_5O_{12}$:Ce is also insoluble in conventional acids, which makes it difficult to recover rare earth elements from waste light-emitting electronic components.

Therefore, in order to efficiently dispose of discarded light-emitting electronic components and recover the resins and rare earth elements therein, while avoiding the complex process flow, high resource waste rate, and serious secondary pollution in the recycling process, based on the pyrolysis characteristics of the resin and the rare earth elements in the phosphors, it is necessary to develop a new method for recycling and processing waste light-emitting electronic components.

SUMMARY

This patent invents a method for recycling rare earth elements from waste light-emitting electronic components by pyrolysis and alkaline melting-acid leaching, which solves the problem of difficulty in recycling rare earth elements contained in the traditional mechanical disassembly method. Based on the pyrolysis characteristics of organic polymer compounds, realizes the dismantling and conversion of waste light-emitting electronic components to generate pyrolysis gas, pyrolysis oil and pyrolysis residue. The high temperature water vapor converts the carbon in it into water gas. Pyrolysis gas and water gas can supplement energy for the whole system, pyrolysis oil can be used as fuel, and metals and phosphor powder are retained in the pyrolysis slag. Eddy current sorting is used to separate the phosphor powder in the pyrolysis slag from metals. Based on the mineral phase characteristics of the rare earth components in the phosphors, the "alkali melting-acid leaching" combined process is used to extract rare earth elements with high efficiency. First, the soluble components in the phosphor are extracted by conventional acid leaching, while the insoluble garnet system phosphor and nitrogen oxide system phosphor remain in the filter residue 1; then, efficient extraction of rare earth elements is realized by alkali melting-acid leaching in nitrogen oxide system phosphors and garnet system phosphors; finally, rare earth oxalates are recovered by oxalic acid precipitation. Through the above-mentioned recycling process design, the step-by-step efficient extraction of rare earth elements in waste light-emitting electronic components can be realized, which greatly reduces the difficulty of separation and purification in the later stage.

Raw Material:

Pyrolysis catalyst—$Al_2O_3$, ZnO, $Fe_2O_3$, CaO or $Ca(OH)_2$, etc.;

Alkaline melting agent—$Na_2O_2$, NaOH or $Na_2CO_3$, etc.;

Acid leaching solvent—hydrochloric acid, mass fraction 38%;

Acid leaching auxiliary solvent—hydrogen peroxide, mass fraction 30%;

Eluent—NaOH;

Dispersant—PEG 20000 or PEI, etc.;

Precipitant—oxalic acid solution, mass concentration 30 g/L.

Steps:

The method for recycling rare earth elements from waste light-emitting electronic components by pyrolysis and alkaline melting-acid leaching described in the present invention includes the following steps:

(1) Pyrolysis of waste light-emitting electronic components: using a steel belt continuous pyrolysis furnace to pyrolyze waste light-emitting electronic components, natural gas and pyrolysis gas are used as energy sources, $N_2$ is introduced into the furnace as a protective gas, and the combustion flue gas is sent to the flue gas boiler for cooling and recycling heat, oil-gas mixture and residue are obtained. The initial temperature of pyrolysis is 300-400° C., the end temperature is 500-650° C., and 3-stage zone temperature control heating is adopted. The temperature of zone 1 is 300-400° C., the temperature of zone 2 is 400-550° C., temperature of zone 3 is 500-650° C., the pyrolysis time is 90-150 min.

(2) Preparation of water gas: under the protection of $N_2$ atmosphere, the residue with residual heat is sent to the gas generator, and high-temperature water vapor is introduced to convert the carbon in the residue into water gas to obtain pyrolysis residue. The temperature of the water vapor is 750-900° C., the reaction pressure is 2.3-3.2 MPa, and the reaction time is 3-5 min.

(3) Elution and separation of oil and gas mixture: the oil and gas mixture is sent to the spray condensing tower, HBr is removed by lye spray and the oil and gas are separated, water in the eluent is evaporated by the heat of the flue gas boiler to produce NaBr, pyrolysis Oil, pyrolysis gas and NaBr are obtained. The mass percentage concentration of NaOH solution is 5-10%.

(4) Pyrolysis slag sorting and acid leaching: phosphor powder in the pyrolysis slag is separated from metals by eddy current separation, and acid leaching solvent and acid leaching auxiliary solvent are added to the phosphor powder for acid leaching treatment. Filtrate 1 and filter residue 1 are obtained by filtration. The temperature of acid leaching reaction is 30-50° C., the reaction time is 40-80 min, the acid leaching solvent addition amount is: every kilogram of alkali melting product adds 3-8 L acid leaching solvent, and 2-4 L/kg acid leaching auxiliary solvent.

(5) Alkali melting and acid leaching: adding alkali melting agent to filter residue 1, using natural gas and water gas as energy sources, performing high temperature alkali melting and obtaining an alkali melting product; then adding acid leaching solvent and acid leaching auxiliary solvent to the alkali melting product to carry out acid leaching treatment, the leaching of phosphor powder of nitrogen oxide system and garnet system is realized, and filtrate 2 containing $Eu^{3+}$, Tb' and Ce' is obtained by filtration. The mass ratio of high temperature alkali slag to alkali is 1:2-1:6, the calcination temperature is 600-1000° C., and the calcination time is 30-60 min; the acid leaching reaction temperature is 70-90° C., the reaction time is 20-25 min, the acid leaching solvent addition amount is: every kilogram of alkali melting product adds 3-8 L acid leaching solvent, and 2-4 L/kg acid leaching auxiliary solvent.

(6) Preparation of rare earth oxalate: Mix filtrate 1 and filtrate 2, add a dispersant to the mixed solution, stir and mix well. After adding the oxalic acid solution, the pH of the solution is adjusted to 1.8-2.0 with ammonia water, and the solution is settled at 23-28° C. for 4-6 hours. After the precipitation is complete, the precipitation is filtered, washed, and dried by the heat of the flue gas boiler to obtain rare earth oxalate. The dispersing agent is PEG 20000 or PEI, etc., and the added amount is 3-5% of the mass of the mixed solution, and the added amount of the oxalic acid solution is 20-33% of the mass of the mixed solution.

Based on the pyrolysis characteristics of organic polymer compounds, the organic polymer substances such as epoxy resin encapsulation materials and polymer substrates in waste light-emitting electronic components are pyrolyzed to realize the separation of various components in waste light-emitting electronic components. And based on the mineral phase characteristics of the rare earth components in the phosphor, the "alkali melting-acid leaching" combined process is used to extract the rare earth elements with high efficiency.

Compared with the traditional process, the method realizes the recovery of organic polymer compounds such as resin encapsulation materials in waste light-emitting electronic components through pyrolysis, which can obtain higher-purity rare earth oxalate precipitation, avoiding the influence of other impurities in the rare earth recovery process. The pyrolysis gas and water gas obtained from the solution can supply energy for the system, and at the same time recover the heat in the flue gas, saving a lot of energy in industrial applications. At the same time, the use of the pyrolysis treatment and the combined "alkali melting-acid leaching" process to recover the rare earth elements in the phosphor can avoid the large discharge of pollutants in the traditional process.

DESCRIPTION OF DRAWINGS

FIG. 1 shows the flow chart of the invention

EMBODIMENTS

In the embodiments:

Acid leaching solvent—hydrochloric acid, mass fraction 38%;

Acid leaching auxiliary solvent—hydrogen peroxide, mass fraction 30%;

Precipitant—oxalic acid solution, concentration 30 g/L;

Embodiment 1

The waste light-emitting electronic components are sent to the steel strip continuous pyrolysis furnace for pyrolysis for 90 min, and $N_2$ is introduced into the furnace as a protective gas, the initial pyrolysis temperature was set at 320° C. and the final pyrolysis temperature was set at 520° C. The temperature of zone 1 is 320° C., the temperature of zone 2 is 450° C., and the temperature of zone 3 is 520° C. to obtain oil and gas mixture and residue; under the protection of $N_2$ atmosphere, the residue with residual heat is sent to the gas generator, and water vapor at 800° C. is introduced, the reaction was carried out under 3.0 MPa for 4 min to obtain pyrolysis residue and water gas; the oil and gas mixture is sent to the spray condensation tower, and the NaOH alkali solution with a mass percentage concentration of 6% is sprayed to obtain pyrolysis oil, pyrolysis gas and NaBr; eddy current was used to separate pyrolysis slag, and the phosphor powder is obtained by separation. Add 6 L of hydrochloric acid with a mass fraction of 38% and 2 L of hydrogen peroxide with a mass fraction of 30% into each kilogram of phosphor powder for acid leaching treatment. The reaction temperature is set to 40° C. and the reaction time is 60 min. Filtrate 1 and filter residue 1 are obtained by filtration, the leaching efficiency of $Y^{3+}$ is 99.95%; add $Na_2O_2$ alkali melting agent with a slag-alkali mass ratio of 1:2 in filter residue 1 for high-temperature alkali melting, set the calcination temperature at 700° C., calcination time 60 min, add 4 L of hydrochloric acid with a mass fraction of 38% and 2 L of hydrogen peroxide with a mass fraction of 30% in every kilogram of filter residue 1 to carry out acid leaching treatment, set the reaction temperature to 75° C. and the reaction time to 25 min, and filter to obtain filtrate 2. The leaching efficiency of $Eu^{3+}$, $Tb^{3+}$ and $Ce^{3+}$ is 99.50%; mix filtrate 1 and filtrate 2, add 2% mass of PEG 20000 dispersant of the mixed solution, stir and mix, add 25% mass of 30 g/L oxalic acid solution of the mixed solution, adjust the pH of the solution to 2.0 with ammonia, and settle for 4 hours at 25° C., after filtration, washing and drying, rare earth oxalate is obtained, and the total recovery rate of rare earth is 99.12%.

Embodiment 2

The waste light-emitting electronic components are sent to the steel strip continuous pyrolysis furnace for pyrolysis for 90 min, and $N_2$ is introduced into the furnace as a protective gas, the initial pyrolysis temperature was set at 330° C. and the final pyrolysis temperature was set at 560° C. The temperature of zone 1 is 330° C., the temperature of zone 2 is 480° C., and the temperature of zone 3 is 560° C. to obtain oil and gas mixture and residue; under the protection of $N_2$ atmosphere, the residue with residual heat is sent to the gas generator, and water vapor at 800° C. is introduced, the reaction was carried out under 3.0 MPa for 4 min to obtain pyrolysis residue and water gas; the oil and gas mixture is sent to the spray condensation tower, and the NaOH alkali solution with a mass percentage concentration of 6% is sprayed to obtain pyrolysis oil, pyrolysis gas and NaBr; eddy current is used to separate pyrolysis slag, and the phosphor powder is obtained by separation. Add 6 L of hydrochloric acid with a mass fraction of 38% and 2 L of hydrogen peroxide with a mass fraction of 30% into each kilogram of phosphor powder for acid leaching treatment. The reaction temperature is set to 40° C. and the reaction time is 60 min. Filtrate 1 and filter residue 1 are obtained by filtration, the leaching efficiency of $Y^{3+}$ is 99.96%; add $Na_2O_2$ alkali melting agent with a slag-alkali mass ratio of 1:6 in filter residue 1 for high-temperature alkali melting, set the calcination temperature at 750° C., calcination time 65 min, add 4 L of hydrochloric acid with a mass fraction of 38% and 2 L of hydrogen peroxide with a mass fraction of 30% in every kilogram of filter residue 1 to carry out acid leaching treatment, set the reaction temperature to 75° C. and the reaction time to 25 min, and filter to obtain filtrate 2. The leaching efficiency of $Eu^{3+}$, $Tb^{3+}$ and $Ce^{3+}$ is 99.58%; mix filtrate 1 and filtrate 2, add 2% mass of PEG 20000 dispersant of the mixed solution, stir and mix, add 25% mass of 30 g/L oxalic acid solution of the mixed solution, adjust the pH of the solution to 2.0 with ammonia, and settle for 4 hours at 25° C., after filtration, washing and drying, rare earth oxalate is obtained, and the total recovery rate of rare earth is 99.75%.

Embodiment 3

The waste light-emitting electronic components are sent to the steel strip continuous pyrolysis furnace for pyrolysis for 95 min, and $N_2$ is introduced into the furnace as a protective gas, the initial pyrolysis temperature was set at 340° C. and the final pyrolysis temperature was set at 520° C. The temperature of zone 1 is 340° C., the temperature of zone 2 is 470° C., and the temperature of zone 3 is 520° C. to obtain oil and gas mixture and residue; under the protection of $N_2$ atmosphere, the residue with residual heat is sent to the gas generator, and water vapor at 800° C. is introduced, the reaction was carried out under 3.0 MPa for 4 min to obtain pyrolysis residue and water gas; the oil and gas mixture is sent to the spray condensation tower, and the NaOH alkali solution with a mass percentage concentration of 6% is sprayed to obtain pyrolysis oil, pyrolysis gas and NaBr; eddy current is used to separate pyrolysis slag, and the phosphor powder is obtained by separation. Add 6 L of hydrochloric acid with a mass fraction of 38% and 2 L of hydrogen peroxide with a mass fraction of 30% into each kilogram of phosphor powder for acid leaching treatment. The reaction temperature is set to 40° C. and the reaction time is 60 min. Filtrate 1 and filter residue 1 are obtained by filtration, the leaching efficiency of $Y^{3+}$ is 99.95%; add $Na_2O_2$ alkali melting agent with a slag-alkali mass ratio of 1:4 in filter residue 1 for high-temperature alkali melting, set the calcination temperature at 800° C., calcination time 65 min, add 4 L of hydrochloric acid with a mass fraction of 38% and 2 L of hydrogen peroxide with a mass fraction of 30% in every kilogram of filter residue 1 to carry out acid leaching treatment, set the reaction temperature to 75° C. and the reaction time to 25 min, and filter to obtain filtrate 2. The leaching efficiency of $Eu^{3+}$, $Tb^{3+}$ and $Ce^{3+}$ is 99.53%; mix filtrate 1 and filtrate 2, add 2% mass of PEG 20000 dispersant of the mixed solution, stir and mix, add 25% mass of 30 g/L oxalic acid solution of the mixed solution, adjust the pH of the solution to 2.0 with ammonia, and settle for 4 hours at 25° C., after filtration, washing and drying, rare earth oxalate is obtained, and the total recovery rate of rare earth is 99.59%.

Embodiment 4

The waste light-emitting electronic components are sent to the steel strip continuous pyrolysis furnace for pyrolysis for 100 min, and $N_2$ is introduced into the furnace as a protective gas, the initial pyrolysis temperature was set at 320° C. and the final pyrolysis temperature was set at 540° C. The temperature of zone 1 is 320° C., the temperature of zone 2 is 480° C., and the temperature of zone 3 is 540° C. to obtain oil and gas mixture and residue; under the protection of $N_2$ atmosphere, the residue with residual heat is sent to the gas generator, and water vapor at 800° C. is introduced, the reaction was carried out under 3.0 MPa for 4 min to obtain pyrolysis residue and water gas; the oil and gas mixture is sent to the spray condensation tower, and the NaOH alkali solution with a mass percentage concentration of 6% is sprayed to obtain pyrolysis oil, pyrolysis gas and NaBr; eddy current is used to separate pyrolysis slag, and the phosphor powder is obtained by separation. Add 6 L of hydrochloric acid with a mass fraction of 38% and 2 L of hydrogen peroxide with a mass fraction of 30% into each kilogram of phosphor powder for acid leaching treatment. The reaction temperature is set to 40° C. and the reaction time is 60 min. Filtrate 1 and filter residue 1 are obtained by filtration, the leaching efficiency of $Y^{3+}$ is 99.96%; add $Na_2O_2$ alkali melting agent with a slag-alkali mass ratio of 1:4 in filter residue 1 for high-temperature alkali melting, set the calcination temperature at 700° C., calcination time 60 min, add 4 L of hydrochloric acid with a mass fraction of 38% and 2 L of hydrogen peroxide with a mass fraction of 30% in every kilogram of filter residue 1 to carry out acid leaching treatment, set the reaction temperature to 85° C. and the reaction time to 20 min, and filter to obtain filtrate 2. The leaching efficiency of $Eu^{3+}$, $Tb^{3+}$ and $Ce^{3+}$ is 99.56%; mix filtrate 1 and filtrate 2, add 2% mass of PEG 20000 dispersant of the mixed solution, stir and mix, add 25% mass of 30 g/L oxalic acid solution of the mixed solution, adjust the pH of the solution to 2.0 with ammonia, and settle for 4 hours at 25° C., after filtration, washing and drying, rare earth oxalate is obtained, and the total recovery rate of rare earth is 99.64%.

We claim:

1. A method of pyrolysis for waste light-emitting electronic components and recovery for rare-earth element, comprising:

step 1: using a steel belt continuous pyrolysis furnace to pyrolyze waste light-emitting electronic components, wherein $N_2$ is introduced into the steel belt continuous pyrolysis furnace as a protective gas, oil-gas mixture and residue are obtained by heating and pyrolysis; initial temperature of the pyrolysis is 300-400° C., end temperature of the pyrolysis is 500-650° C.; 3-stage zone temperature control heating is adopted, temperature of zone 1 is 300-400° C., temperature of zone 2 is 400-550° C., temperature of zone 3 is 500-650° C., and pyrolysis time is 90-150 min;

step 2: the residue with residual heat is sent, under protection of $N_2$ atmosphere, to a gas generator, and high-temperature water vapor is introduced to convert carbon in the residue into water gas to obtain pyrolysis residue; temperature of the high-temperature water vapor is 750-900° C., reaction pressure is 2.3-3.2 MPa, and reaction time is 3-5 min;

step 3: the oil-gas mixture is sent to a spray condensing tower, HBr is removed by lye spray and oil and gas are separated, pyrolysis oil, pyrolysis gas and NaBr are obtained;

step 4: phosphor powder in the pyrolysis residue and metals in the pyrolysis residue are separated by eddy current separation, and acid leaching solvent and acid leaching auxiliary solvent are added to the phosphor powder to conduct acid leaching reaction; filtrate 1 and filter residue 1 are obtained by filtration;

step 5: adding alkali melting agent to filter residue 1, performing an alkali melting process to obtain an alkali melting product; then adding acid leaching solvent and acid leaching auxiliary solvent to the alkali melting product to carry out acid leaching treatment, phosphor powder of nitrogen oxide system and phosphor powder of garnet system are leached, and filtrate 2 containing $Eu^{3+}$, $Tb^{3+}$ and $Ce^{3+}$ is obtained by filtration; in the alkali melting process, a mass ratio of filter residue 1 to the alkali melting agent is 1:2-1:6, calcination temperature is 600-1000° C., and calcination time is 30-60 min;

step 6: mixing filtrate 1 and filtrate 2 to obtain a mixed solution, adding a dispersant to the mixed solution, stirring and mixing; adding an oxalic acid solution to the mixed solution, then adding ammonia water to the mixed solution to obtain a final solution, wherein pH of the final solution is adjusted to 1.8-2.0 with the ammonia water, and the final solution is settled at 23-28° C. for 4-6 hours; after the settling of the final solution is complete, precipitation is filtered, washed, and dried by heat from a flue gas boiler to obtain rare earth oxalate.

2. The method of pyrolysis for waste light-emitting electronic components and recovery for rare-earth element according to claim 1, wherein:

in step 3, the lye is a NaOH solution and a mass percentage concentration of the NaOH solution is 5-10%.

3. The method of pyrolysis for waste light-emitting electronic components and recovery for rare-earth element according to claim 1, wherein:

in step 4, the acid leaching reaction is conducted at 30-50° C. for 40-80 min, the acid leaching solvent and the acid leaching auxiliary solvent are added at following ratios: every kilogram of the phosphor powder adds 3-8 L of the acid leaching solvent, and 2-4 L of the acid leaching auxiliary solvent.

4. The method of pyrolysis for waste light-emitting electronic components and recovery for rare-earth element according to claim 1, wherein:

in step 5, the acid leaching treatment is carried out at 70-90° C. for 20-25 min, the acid leaching solvent and the acid leaching auxiliary solvent are added at ratios: every kilogram of the alkali melting product adds 3-8 L of the acid leaching solvent, and 2-4 L of the acid leaching auxiliary solvent.

5. The method of pyrolysis for waste light-emitting electronic components and recovery for rare-earth element according to claim 1, wherein:

in step 6, the dispersing agent is Polyethylene Glycol (PEG) 20000 or Polyethyleneimine (PEI), and added in the amount of 3-5% (Wt) of the mixed solution, and the oxalic acid solution is added in the amount of 20-33% (wt) of the mixed solution.

* * * * *